(12) United States Patent
Park et al.

(10) Patent No.: US 9,118,218 B2
(45) Date of Patent: Aug. 25, 2015

(54) POWER MANAGEMENT APPARATUS AND METHOD FOR CONTROLLING THE POWER MANAGEMENT APPARATUS

(75) Inventors: Young Jin Park, Bucheon-si (KR); Hyun Soo Park, Seoul (KR); Jae Hwi Jang, Yongin-si (KR); Jong Hyun Shin, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 413 days.

(21) Appl. No.: 13/137,151

(22) Filed: Jul. 22, 2011

(65) Prior Publication Data

US 2012/0089263 A1  Apr. 12, 2012

(51) Int. Cl.
*H02J 13/00* (2006.01)
*H04L 12/46* (2006.01)

(52) U.S. Cl.
CPC ........... *H02J 13/001* (2013.01); *H02J 13/0086* (2013.01); *H04L 12/4666* (2013.01); *Y02B 70/3266* (2013.01); *Y04S 10/40* (2013.01); *Y04S 20/242* (2013.01)

(58) Field of Classification Search
None
See application file for complete search history.

(56) References Cited

U.S. PATENT DOCUMENTS

| | | | | |
|---|---|---|---|---|
| 6,246,677 B1 * | 6/2001 | Nap et al. | | 370/346 |
| 7,609,153 B2 * | 10/2009 | Hatakenaka | | 340/505 |
| 7,974,714 B2 * | 7/2011 | Hoffberg | | 700/94 |
| 7,983,795 B2 * | 7/2011 | Josephson et al. | | 700/276 |
| 8,447,541 B2 * | 5/2013 | Rada et al. | | 702/60 |
| 8,457,013 B2 * | 6/2013 | Essinger et al. | | 370/254 |
| 8,461,725 B1 * | 6/2013 | Stubbs et al. | | 307/140 |
| 8,514,540 B2 * | 8/2013 | Besore et al. | | 361/116 |
| 2006/0149407 A1 * | 7/2006 | Markham et al. | | 700/108 |
| 2007/0155349 A1 * | 7/2007 | Nelson et al. | | 455/128 |
| 2009/0156179 A1 * | 6/2009 | Hahn et al. | | 455/414.1 |
| 2009/0157529 A1 * | 6/2009 | Ehlers et al. | | 705/26 |
| 2010/0076615 A1 * | 3/2010 | Daniel et al. | | 700/293 |
| 2010/0102051 A1 * | 4/2010 | Ebrom et al. | | 219/520 |
| 2010/0109619 A1 * | 5/2010 | Tsou et al. | | 323/234 |
| 2010/0145542 A1 * | 6/2010 | Chapel et al. | | 700/295 |
| 2010/0145885 A1 * | 6/2010 | Graziano et al. | | 705/412 |
| 2010/0161148 A1 * | 6/2010 | Forbes et al. | | 700/295 |

(Continued)

FOREIGN PATENT DOCUMENTS

CN  2620455  6/2004

OTHER PUBLICATIONS

Chinese Office Action issued Oct. 8, 2014 in corresponding Chinese Patent Application No. 201110259578.5.

*Primary Examiner* — Ryan Jarrett
(74) *Attorney, Agent, or Firm* — Staas & Halsey LLP

(57) ABSTRACT

A power management system includes a smart socket to meter power consumption of an electric device by connecting to the electric device, and be assigned a code, a power management apparatus to display a code image when a registration mode of the smart socket is performed, and a terminal to acquire a code image of the power management apparatus and a code image of the smart socket, receive information of an electric device to be coupled to the smart socket, read the acquired code images of the power management apparatus and the smart socket, pair the read power management apparatus and the smart socket code with the electric device information, and transmit the paired information to the power management apparatus. Users of all ages and dexterity can easily register, change, and release the smart socket and the electric device, such that user efficiency and accessibility are increased.

18 Claims, 8 Drawing Sheets

(56) References Cited

U.S. PATENT DOCUMENTS

| | | | |
|---|---|---|---|
| 2010/0177660 A1* | 7/2010 | Essinger et al. | 370/254 |
| 2010/0256828 A1* | 10/2010 | Wang | 700/286 |
| 2010/0262312 A1* | 10/2010 | Kubota et al. | 700/295 |
| 2010/0280674 A1* | 11/2010 | Jalili | 700/295 |
| 2011/0202189 A1* | 8/2011 | Venkatakrishnan et al. | 700/286 |
| 2011/0202293 A1* | 8/2011 | Kobraei et al. | 702/62 |
| 2011/0264286 A1* | 10/2011 | Park | 700/286 |
| 2013/0176106 A1* | 7/2013 | Schultz et al. | 340/5.52 |

\* cited by examiner

POWER MANAGEMENT APPARATUS AND METHOD FOR CONTROLLING THE POWER MANAGEMENT APPARATUS

CROSS-REFERENCE TO RELATED APPLICATIONS

This application claims the benefit of Korean Patent Application No. 2010-0099070, filed on Oct. 12, 2010 in the Korean Intellectual Property Office, the disclosure of which is incorporated herein by reference.

BACKGROUND

1. Field

Embodiments relate to a power management apparatus interoperating with a smart socket coupled to an electric device, a power management system including the power management apparatus, and a method for controlling the power management system.

2. Description of the Related Art

With the development of Information Technology (IT), the number of household appliances powered by electricity is rapidly increasing, in turn leading to increasing power consumption. In order to satisfy such increased power demand, the number of power plants is rapidly increasing. However, as can be seen from a power demand pattern, peak capacity is not reached during most days of the year, that is to say, power plants only operate at full capacity during a few days out of the year.

A state in which a high power demand is required for a short time is called peak load. During periods of peak load, electricity costs the most to generate and deliver, and therefore power providers raise the power rate charged to consumers during periods of peak load. Construction costs for adding an additional power plant to the grid are extremely high and maintenance costs for power plants constructed to maintain peak load for a short period are considerable.

Recently, numerous developers are conducting intensive research into a demand management method for temporarily restricting power consumption by limiting peak load without constructing such additional power plants. For the aforementioned purposes, demand management is a focus of attention, and a great deal of research is focused upon an advanced demand management format for demand response (DR).

DR is a system for intelligently managing energy consumption depending upon variation in power rates. For example, the consumer may temporarily stop an air-conditioner so as to reduce power consumption when power rates are high.

By means of the DR, a power-supply source can alter user power consumption patterns to achieve load balancing and can restrict user power consumption to periods when demand is low, thereby reducing the user's overall energy expenditure.

Therefore, an Energy Management System (EMS) to which demand response (DR) is applied has been developed. The EMS receives current power rate information from the power provider, displays a current power rate on the display, and controls driving of each electric device on the basis of the current power rate information and power consumption of each electric device.

In this case, the electric device is a smart electric device that meters power and performs a communication function, is controlled by the EMS, meters power consumption when driven by the EMS, and transmits the metered power to the EMS.

As described above, in order to effectively utilize power at a low price, the EMS and the smart electric device must be installed in every home. However, because the lifetime of a general electric device currently used in each home and the purchase price of the smart electric device, installation of the smart electric device in every home is difficult. That is, a considerably long period of time may be required before such smart electric devices can enter into widespread use.

Therefore, although each home can effectively utilize power at a low price, it is difficult to effectively utilize power in each home because a smart electric device has not been installed in most homes.

SUMMARY

Therefore, it is an aspect to provide a power management apparatus for allowing a user to register, change, and release a smart socket that is coupled to an electric device to measure power consumption of the electric device, a power management system including the power management apparatus, and a method for controlling the same.

It is another aspect to provide a power management apparatus that includes an imaging unit and registers/changes/releases a smart socket using the imaging unit, a power management system including the power management apparatus, and a method for controlling the same.

It is another aspect to provide a power management apparatus for registering, changing, and releasing a smart socket using a terminal, a power management system including the power management apparatus, and a method for controlling the same.

It is another aspect to provide a power management apparatus for automatically sensing change of an electric device coupled to a smart socket, a power management system including the power management apparatus, and a method for controlling the same.

Additional aspects will be set forth in part in the description which follows and, in part, will be apparent from the description, or may be learned by practice of the invention.

In accordance with one aspect, a power management apparatus includes a display to display a message that invites the user to input an identification (ID) number of a smart socket and information of an electric device to be coupled to the smart socket in a registration mode of the smart socket; an input unit to receive the ID number of the smart socket and the information of the electric device to be coupled to the smart socket from the user; and a controller to pair the ID number of the smart socket with the electric device information.

The controller, if the ID number of the smart socket is paired with the electric device information, generates a Personal Area Network identification number (PAN ID) of the smart socket, and further includes a communication unit to transmit the generated PAN ID to the smart socket.

The controller confirms a communication state with the smart socket, if communication with the smart socket is severed, searches for a PAN ID corresponding to the disconnected smart socket, and re-communicates with the smart socket having the searched PAN ID.

The apparatus may further include a storage unit to store a Personal Area Network identification number (PAN ID), an Internet Protocol (IP) address, and a MAC address, and store the ID number of the paired smart socket with the electric device information.

The controller further includes a change mode to change information of the electric device to be coupled to the smart socket, and a release mode to release the registered smart socket.

The controller receives power rate information from a power provider, receives power consumption information of the electric device from the smart socket, and configures a driving schedule of the electric device on the basis of power consumption information of the power rate information and the power consumption information of the electric device.

The controller receives power consumption information of the electric device from the smart socket, and determines whether the electric device coupled to the smart socket is changed on the basis of power consumption information of the electric device.

The controller receives power consumption information of the electric device from the smart socket, collects power factor information of the electric device by analyzing the power consumption information of the electric device, and determines whether the electric device coupled to the smart socket is changed on the basis of the collected power factor information.

In accordance with another aspect, a power management apparatus includes a display to display a message that invites the user to input a code image of a smart socket and information of an electric device to be coupled to the smart socket in a registration mode of the smart socket; an imaging unit to receive the code image of the smart socket; an input unit to receive information of the electric device to be coupled to the smart socket; and a controller to read the code image of the smart socket, and pair the read smart socket code with the electric device information.

The controller generates at least one of a Personal Area Network identification number (PAN ID) and an Internet Protocol (IP) address of the smart socket when the smart socket is paired with the electric device, and further includes a communication unit to transmit at least one of the PAN ID and the IP address to the smart socket.

The controller confirms a communication state with the smart socket, if communication with the smart socket is severed, searches for a PAN ID corresponding to the disconnected smart socket, and re-communicates with the smart socket having the searched PAN ID.

The controller receives power rate information from a power provider, receives power consumption information of the electric device from the smart socket; and configures a driving schedule of the electric device on the basis of power consumption information of the power rate information and the power consumption information of the electric device.

The controller receives power consumption information of the electric device from the smart socket, and determines whether the electric device coupled to the smart socket is changed on the basis of power consumption information of the electric device.

The controller receives power consumption information of the electric device from the smart socket, collects power factor information of the electric device by analyzing the power consumption information of the electric device, and determines whether the electric device coupled to the smart socket is changed on the basis of the collected power factor information.

In accordance with another aspect, a power management system includes a smart socket to meter power consumption of the electric device by connecting to the electric device, and be assigned a code; a power management apparatus to display a code image when a registration mode of the smart socket is performed; and a terminal to acquire a code image of the power management apparatus and a code image of the smart socket, receive information of an electric device to be coupled to the smart socket, read the acquired code images of the power management apparatus and the smart socket, pair the read power management apparatus and the smart socket code with the electric device information, and transmit the paired information to the power management apparatus.

The terminal displays a message that invites a user to enter a code image of the power management apparatus, a code image of the smart socket, and information of the electric device to be coupled to the smart socket in a registration mode of the smart socket.

The power management apparatus stores the pairing information, generates at least one of a PAN ID and an IP address of the smart socket, and transmits the generated one to the terminal.

The smart socket updates at least one of the PAN ID and the IP address received from the power management apparatus.

The code of the power management apparatus includes a PAN ID, an IP address, a MAC address, and product name information.

The terminal downloads an application to pair the smart socket with the electric device from the power management apparatus.

The terminal acquires a code image of the power management apparatus, and automatically downloads an application from the power management apparatus on the basis of the acquired code information of the electric device.

The terminal receives an authentication number from the power management, if the authentication with the power management apparatus is completed through the received authentication number, and downloads an application from the power management apparatus.

The application of the terminal includes a registration mode to register the smart socket, a change mode to change information of the electric device to be coupled to the smart socket, and a release mode to release registration of the smart socket.

The power management apparatus receives power rate information from a power provider, receives power consumption information of the electric device from the smart socket, configures a driving schedule of the electric device on the basis of the power rate information and the power consumption information of the electric device, and displays the driving schedule of the electric device.

The power management apparatus receives power consumption information of the electric device from the smart socket, and determines whether the electric device coupled to the smart socket is changed on the basis of power consumption information of the electric device.

The power management apparatus receives power consumption information of the electric device from the smart socket, collects power factor information of the electric device by analyzing the power consumption information of the electric device, and determines whether the electric device coupled to the smart socket is changed on the basis of the collected power factor information.

In accordance with another aspect, a method for controlling a power management apparatus includes, if a registration mode of a smart socket is carried out by a user, receiving an identification (ID) number of the smart socket; receiving information of an electric device to be coupled to the smart socket; pairing the received electric device information with the ID number of the smart socket; receiving power rate information from a power provider; receiving power consumption information of the electric device from the smart socket; and configuring a driving schedule of the electric device on the basis of the power rate information and the power consumption information of the electric device, and displaying the configured driving schedule.

The method may further include, if the ID number of the smart socket is paired with the electric device information, generating a Personal Area Network identification number (PAN ID) of the smart socket; and transmitting the generated PAN ID to the smart socket.

The method may further include confirming a communication state with the smart socket; if the disconnected smart socket is confirmed, searching for a PAN ID corresponding to the disconnected smart socket; and re-communicating with the smart socket having the searched PAN ID.

The pairing of the smart socket ID number and the electric device information further includes pairing a PAN ID of the smart socket and an IP address with MAC address information.

The method may further include, if an information change mode of the electric device to be coupled to the smart socket is performed, receiving an identification (ID) number of the smart socket; receiving information of the electric device to be changed; and pairing the ID number of the smart socket with the information of the electric device to be changed, and storing the paired result.

The method may further include, if a registration release mode of the smart socket is performed, receiving an identification (ID) number of the smart socket; and deleting the ID number of the smart socket, and releasing the registered smart socket.

The method may further include receiving power consumption information of the electric device from the smart socket, and determining whether the electric device coupled to the smart socket is changed on the basis of power consumption information of the electric device.

The method may further include receiving power consumption information of the electric device from the smart socket, collecting power factor information of the electric device by analyzing the power consumption information of the electric device, and determining whether the electric device coupled to the smart socket is changed on the basis of the collected power factor information.

In accordance with another aspect, a method for controlling a power management apparatus includes, if a registration mode of a smart socket is carried out by a user, acquiring a code image of the smart socket, and reading the code image of the smart socket; receiving information of an electric device to be coupled to the smart socket; pairing the received electric device information with a code of the smart socket; receiving power rate information from a power provider; receiving power consumption information of the electric device from the smart socket; and configuring a driving schedule of the electric device on the basis of the power rate information and the power consumption information of the electric device, and displaying the configured driving schedule.

The method may further include, if an information change mode of the electric device to be coupled to the smart socket is performed, acquiring a code image of the smart socket, and reading the code image of the smart socket; receiving information of the electric device to be changed; and pairing a code of the smart socket with the information of the electric device to be changed, and storing the paired result.

The method may further include, if a registration release mode of the smart socket is performed, acquiring a code image of the smart socket, and reading the code image of the smart socket; and deleting a code of the smart socket, and releasing the registered smart socket.

In accordance with another aspect, a method for controlling a power management system includes, if a registration mode of a smart socket is performed in a power management apparatus, and displaying a code image of the power management apparatus; and acquiring a code image of the power management apparatus using a terminal, acquiring a code image of the smart socket, reading the code images of the power management apparatus and the smart socket, receiving information of an electric device to be coupled to the smart socket, pairing a code of the power management apparatus and a code of the smart socket with the electric device information, transmitting the paired information to the power management apparatus, and storing the paired information in the power management apparatus.

The method may further include generating a Personal Area Network identification number (PAN ID), and transmitting the PAN ID to the smart socket; and updating the PAN ID using the smart socket.

The power management apparatus may include receiving power rate information from a power provider, receiving power consumption information of an electric device from the smart socket, and configuring a driving schedule of the electric device on the basis of the power rate information and the power consumption information of the electric device, and displaying the configured driving schedule.

The power management apparatus confirms a communication state with the smart socket, if communication with the smart socket is severed, searches for a PAN ID corresponding to the disconnected smart socket, and re-communicates with the smart socket having the searched PAN ID.

The method may further include, if an information change mode of the electric device to be coupled to the smart socket is performed in the terminal, acquiring a code image of the smart socket, and reading the code image of the smart socket; receiving information of the electric device to be changed; and pairing a code of the smart socket with the information of the electric device to be changed, and transmitting the paired result to the power management apparatus.

The method may further include, if a registration release mode of the smart socket is performed in the terminal, acquiring a code image of the smart socket, and reading the code image of the smart socket; and deleting a code of the smart socket from the power management apparatus.

The power management apparatus receives power consumption information of the electric device from the smart socket, and determines whether the electric device coupled to the smart socket is changed on the basis of power consumption information of the electric device.

The power management apparatus include receiving power consumption information of the electric device from the smart socket, collecting power factor information of the electric device by analyzing the power consumption information of the electric device, and determining whether the electric device coupled to the smart socket is changed on the basis of the collected power factor information.

The receiving of the information of the electric device to be coupled to the smart socket may include outputting a list of product names of electric devices to the terminal, and receiving information of any one of the electric devices contained in the output list as an input.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
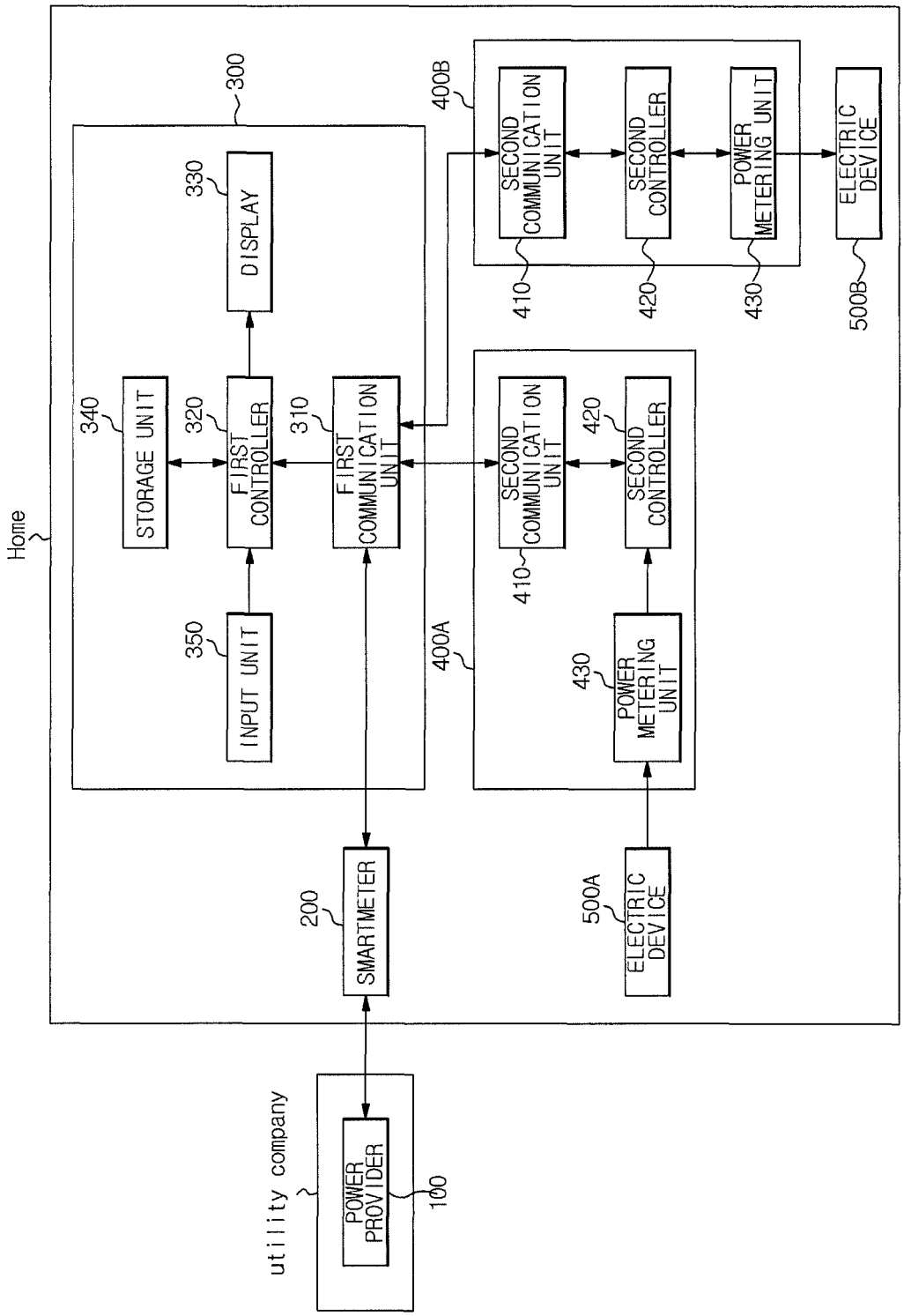
FIG. 1 is a configuration diagram illustrating a power management system according to an embodiment.

Reference will now be made in detail to the embodiments, examples of which are illustrated in the accompanying drawings, wherein like reference numerals refer to like elements throughout.

FIG. 1 is a configuration diagram illustrating a power management system according to an embodiment of the present invention. Referring to FIG. 1, the power management system includes a power provider 100, a smartmeter 200, a power management apparatus 300, smart sockets 400A and 400B, and electric devices 500A and 500B.

The power provider 100 is used as a power supply source that is driven by a power supply company (utility company) so as to generate and provide the power. The power provider 100 generates the power through atomic energy, hydraulic power, thermoelectric power, wind power, etc., and provides the generated power to each electric device 500A or 500B installed in a home.

In this case, in relation to the power provided to the electric device 500A or 500B installed in a home, a predetermined amount of power is generated each hour such that the generated amount of power is provided to each home. In contrast, homes consume different amounts of power depending upon the time of day or season, for example. For example, power consumption of each home in a dawn or morning period is less than that during another period such as the afternoon or dusk. In addition, power consumption of each home in spring or autumn is less than that in summer or winter.

Therefore, the power provider 100 determines the power rate of a period of low power consumption to be less than that of a high power consumption period, determines the power rate of a season of low power consumption to be less than a high power consumption season, and provides power of the determined power rate to each home.

In this way, the power provider 100 adaptively adjusts power rates of each home in response to power consumption demand of each home, and provides the adjusted power to each home, such that demand can be balanced.

That is, the power provider 100 predicts power consumption on the basis of the generation amount of electric power, the past power consumption information for every season and every period, and weather information, and determines power rates on the basis of the predicted power consumption. In this case, it may also be possible to establish a power rate level corresponding to the predicted power rate as necessary.

The power provider 100 collects power consumption amounts of individual homes classified according to individual power rates, and stores the collected power consumption information according to individual power rates, such that the power-supply company calculates power rates (electricity bills) depending upon power consumption for individual power rate levels of each home per month, and charges each home the calculated electricity bills on a monthly basis.

The power provider 100 compares the periodically calculated monthly power rate (monthly bills) with monthly predetermined power rates so as to calculate power bills. If the calculated monthly power rates exceed the monthly predetermined power rates, information about the excess of the monthly predetermined power rates is transmitted to the power management apparatus 300 installed in the corresponding home, such that an event indicating the excess of monthly predetermined power rates is generated through the power management apparatus 300 installed in each home.

The power provider 100 stores a threshold power amount for each home, compares power consumption amount for each home with a threshold power amount, and thus decides a power limitation amount.

In this way, the power provider 100 manages the power demand of each home on the basis of the threshold power amount or the monthly predetermined power rates.

In this case, the threshold power amount for limiting the power supply of each home may be arbitrarily determined by the power supply company, or may be determined by agreement with the power supply company for each home. In addition, the monthly predetermined power rates of each home are determined by agreement with the power supply company.

The power provider 100 is connected to the smartmeter 200 installed in each home, the power management apparatus 300, and each electric device over a network, such that it transmits and receives information regarding power demand management over the network. This network may be any of a wired network, a wireless network, a wired/wireless hybrid network, etc.

The smartmeter 200 is installed in each home, and includes a display such as a liquid crystal display (LCD), such that power consumed in each home is displayed in real time. The smartmeter 200 is an electronic meter, which bidirectionally communicates with the power provider 100 and transmits the consumed power amount to the power provider 100 and the power management apparatus 300.

The smartmeter 200 receives power rate information from the power provider 100, displays the received power rate information, and transmits the power rate information to the EMS 300.

The smartmeter 200 receives power rate information from the power provider 100, displays the received power rate information, and transmits the power rate and the power rate level information to the power management apparatus 300. In addition, the smart meter 200 may further display a price level corresponding to the power rate information upon receiving the power rate information from the power provider 100.

The power management apparatus 300 may also be referred to as a Demand Response (DR) controller. The power management apparatus 300 communicates with the smartmeter 200, and thus receives a power rate and a power rate level corresponding to the power rate from the smartmeter 200. In addition, the power management apparatus 300 communicates with the smart socket 400A or 400B to receive power consumption of the electric device 500A or 500B, generates a driving schedule of the electric device 500A or 500B on the basis of power consumption of the electric device 500A or 500B and the price level of the power provider 100, and informs the user of the driving schedule.

The power management apparatus 300 may also establish a power rate level on the basis of power rates upon receiving only the power rates from the power provider 100.

In this case, the power management apparatus 300 receives power rate information of the power provider 100 through the smartmeter 200, arranges the received power rate information in descending numerical order of power rate, divides the arranged information into a plurality of ranges, and assigns different power rate levels to the divided ranges such that power rate levels are established.

In this case, the number of the power rate levels may be 4 (RTP1 to RTP4), and a plurality of levels may have different power rates and different allowed instantaneous powers. Let us assume that the number of power rate levels is 4 (RTP1 to RTP4). In more detail, the power rate level RTP1 is the lowest power rate level, and the power rate level RTP4 is the highest power rate level. Power rate level is proportional to power rate.

In this way, the power management apparatus 300 collects different power consumptions of individual electric devices through the smart sockets, informs the user of the collected information, schedules an appropriate driving time of each electric device on the basis of the collected power consumption information of the individual electric devices, and recommends the driving time of each electric device to the user.

Therefore, the power management apparatus 300 analyzes power consumption for each electric device, and distributes power consumption in a way that prevents peak load. In addition, when the power rate is high, the power management apparatus 300 may inform the user of the operation stop time point of the electric device, and may invite the user to enter a low power-consumption mode, such that it can reduce the electricity bill to be assessed to the user.

In addition, the power management apparatus 300 determines a standby time until the power rate changes, and informs the user of the determined standby time. The power management apparatus 300 sums the maximum instantaneous power amounts of the electric device to be driven so as to predict instantaneous power, and compares the predicted instantaneous power with the allowed instantaneous power. If the predicted instantaneous power exceeds the allowed instantaneous power, driving may be scheduled on the basis of priorities assigned to several electric devices 500A and 500B.

In addition, if the current electricity bill is close to or higher than the monthly predetermined electricity bill, the power management apparatus 300 may inform the user of this situation as necessary.

The power management apparatus 300 includes a first communication unit 310, a first controller 320, a display 330, a storage unit 340, and an input unit 350.

The first communication unit 310 receives power rate information from the smartmeter 200 and power rate level information corresponding to the received power rate information from the smartmeter 200 by communicating with the smartmeter 200, and transmits the received information to the first controller 320. The first communication unit 310 receives power consumption information of the electric devices 500A and 500B by communicating with the smart sockets 400A and 400B, and transmits the received power consumption information to the first controller 320.

The first communication unit 310 transmits a Personal Area Network identification number (PAN ID) to the smart socket 400A or 400B after the smart socket 400A or 400B is registered.

The first communication unit 310 automatically attempts to access the smart socket 400A or 400B having a PAN ID of the registered smart socket 400A or 400B when communication between the first communication unit 310 and the smart socket 400A or 400B registered in a Personal Area Network (PAN) of the first communication unit 310 is severed, such that it can re-communicate with the smart socket 400A or 400B.

The first controller 320 executes a smart socket registration mode upon receiving a smart socket registration mode selection signal from the input unit 350, and controls the display 330 to display a procedure corresponding to the smart socket registration mode.

If the first controller 320 receives information corresponding to a registration button through the input unit 350 and receives an ID of the smart socket 400A, it registers the ID of the input smart socket 400A. If the electric device 500A to be connected to the registered smart socket 400A is selected, the registered smart socket 400A and the electric device 500A are paired, and the paired result is stored in the storage unit 340.

The first controller 320 generates a PAN ID when the smart socket is registered, controls the first communication unit 310, and transmits the generated PAN ID to the corresponding smart socket.

The smart socket registration mode may further include a change mode and a release mode.

That is, the first controller 320 executes a command corresponding to the change button signal or the release button signal generated from the input unit 350 during the smart socket registration mode.

In more detail, if the user enters a change button, an ID of the smart socket, and information of the electric device, the first controller 320 changes an electric device to be coupled to the input smart socket, and performs pairing of the electric device and the smart socket. If the release button and the smart socket ID are entered by the user, the first controller 320 releases the ID of the input smart socket, and stores not only change information of the smart socket and the electric device but also registration release information of the smart socket in the storage unit 340.

The first controller 320 configures the driving schedule of each electric device 500A or 500B on the basis of power consumption information of each electric device 500A or 500B coupled to the smart socket 400A or 400B, and displays the configured schedule by controlling the display 330.

The first controller 320 confirms a communication state with the smart socket 400A or 400B registered in the storage unit 340 in real time. If the first controller 320 cannot communicate with at least one smart socket from among the smart sockets 400A and 400B registered in the storage unit 340, it reattempts to communicate with the disconnected smart socket so that it can communicate with the disconnected smart socket.

The display 330 displays selection of the smart socket registration mode, and displays not only an indication message for an ID input of the smart socket corresponding to the smart socket registration mode but also an electric device selection indication message, etc.

The display 330 displays the driving schedules of the electric devices 500A and 500B in response to an indication message from the first controller 320.

The power management apparatus 300 further includes a sound unit. If the electric device paired with the smart socket is changed, the sound unit informs the user of the changed electric device. If communication between the smart socket and the power management apparatus 300 is severed, the sound unit may inform the user of the severed communication state as necessary.

The storage unit 340 stores an ID or code of the power management apparatus 300, pairs the ID of the power management apparatus 300, the smart socket ID, and the electric device, and stores the paired result.

The storage unit 340 stores a PAN ID, an MAC address, and an IP address of the power management apparatus 300. The PAN ID and the IP address are changed according to the installation environment of the power management apparatus 300, such that they are automatically updated and stored after the power management apparatus is completely installed.

The input unit 350 includes a smart socket registration mode button for registering, releasing, and changing the smart socket. The input unit 350 further includes a smart socket registration button, a release button, and a change button that are activated under the smart socket registration mode. In addition, the input unit 350 further includes a character button for selecting the electric device and a character button for entering the smart socket ID. In this case, the character may be Korean characters, English letters, and numbers.

The input unit 350 is integrated with the display 330, thereby forming a touchscreen.

Each of the smart sockets 400A and 400B includes a terminal inserted into a commercial power-supply socket, and an insertion groove in which the plug of the electric device is inserted, and an ID or code for user identification.

In this case, the ID or the code is printed on or engraved in the smart socket, and the code may be a bar code or a QR code.

The quick response (QR) code is a matrix-type two-dimensional bar code storing information as a black-and-white matrix, provides a greater capacity than a one-dimensional bar code and has vertical and horizontal information configured in the form of a two-dimensional bard code corresponding to the extended one-dimensional bar code, such that it can store numbers and character data.

Each of the smart sockets 400A and 400B includes a second communication unit 410 for communicating with the power management apparatus 300, a second controller 420 for controlling the communication of the second communication unit 410, and a power metering unit 430 for measuring power consumption of the electric device.

The second communication unit 410 receives a PAN ID from the power management apparatus 300, transmits the PAN ID to the second controller 420, and transmits power consumption information of the connected electric device to the power management apparatus 300.

The second communication unit 410 continuously transmits a communication signal even when communication with the power management apparatus 300 is severed.

The second controller 420 establishes a PAN ID received from the power management apparatus 300, and controls the power metering unit 320 to meter power of the electric device.

Although the PAN ID of the smart socket is not initially established, the PAN ID of the smart socket is updated after the MAC address or the IP address is paired with the power management apparatus 300, such that the resultant PAN ID is established.

As a result, if communication with the power management apparatus 300 is severed, the smart socket can automatically access the power management apparatus 300 through the PAN ID established in the smart socket.

The second controller 420 controls the driving of the second communication unit 410 when communication with the power management apparatus 300 is severed, and continuously transmits a communication signal to the power management apparatus, such that communication re-connection is achieved by the power management apparatus 300.

The power metering unit 430 meters the power of the connected electric device in real time, and transmits the metered power to the second controller 420, such that it can detect the actual power consumed by the electric device.

The power metering unit 430 meters the power using not only a voltage detected at both ends of each AC power line coupled to a plug of the electric device but also any one of AC power lines coupled to the power connector.

In the case of using the smart socket, a general electric device has a communication function and a power metering function, such that it interworks with the power management apparatus. The power management apparatus utilizes electric device power consumption information received through the smart socket, and effectively controls the driving time of the electric device, such that it can balance power use.

The electric device 500A or 500B is a general electric device having no communication function and no power metering function, and may be any one of a washing machine, a dryer, a refrigerator, an air-conditioner, a stove, an electric oven, a television, etc.

The electric devices 500A and 500B are respectively plugged into the smart sockets 400A and 400B so as to connect to the commercial power source, and receive the driving power from the power provider 100 through the smart sockets 400A and 400B.

That is, if the driving of the electric device 500A or 500B is commanded by the user, the power supplied from the power provider 100 is used as the driving power, such that a predetermined operation algorithm is carried out. In this case, the power consumed in the electric device 500A or 500B is detected through the smart socket 400A or 400B. If the electric device 500A or 500B enters a standby mode, the standby power may also be detected through the smart socket 400A or 400B.

Figure 2:
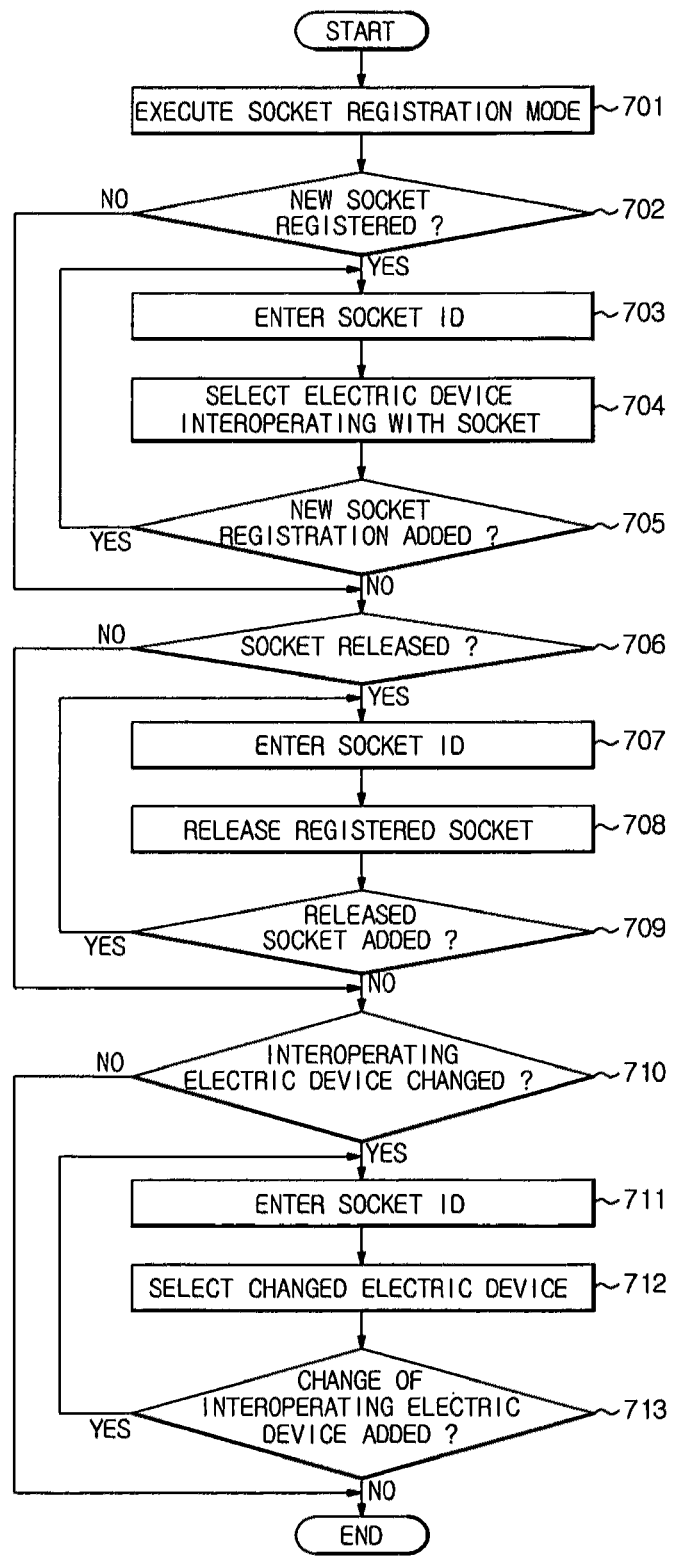
FIG. 2 is a flowchart illustrating a method for controlling a power management system according to an embodiment.

FIG. 2 is a flowchart illustrating a method for controlling a power management system according to an embodiment of the present invention. Referring to FIGS. 1 and 2, in order to allow the smart socket to transmit power consumption information to the power management apparatus 300, the smart socket must recognize the power management apparatus 300 to which the power consumption information of the electric device is to be transmitted.

To accomplish this, if the ID or code of the smart socket is registered in the power management apparatus 300, communication between the smart socket and the power management apparatus 300 is achieved, such that the smart socket can transmit power consumption information of the electric device registered in the power management apparatus 300.

First, if the smart socket registration mode button installed in the input unit 350 is selected by the user, the power management apparatus 300 executes the smart socket registration mode at operation 701. In this case, the power management apparatus 300 sequentially displays messages in response to the execution of the smart socket registration mode on the display 330.

In more detail, the power management apparatus 300 displays a message, that invites the user to enter any one of a new smart socket registration mode, a smart socket registration release mode, and an interoperating electric device changing mode, on the display 330.

The power management apparatus 300 receives information about any one of the new smart socket registration mode, the smart socket registration release mode, and the interoperating electric device changing mode from the user.

The power management apparatus 300 decides whether the smart socket registration mode received from the user is the new smart socket registration mode, the smart socket registration release mode, and the interoperating electric device changing mode, and performs the operation of the decided mode.

That is, if the smart socket registration mode entered by the user is the new smart socket registration mode at operation 702, the power management apparatus displays a message inviting the user to enter the ID or code of the smart socket on the display 330, and receives the smart socket ID or code from the user at operation 703.

The power management apparatus 300 displays a message requesting that the user select an electric device to interwork with the smart socket on the display 330. If the user selects a desired electric device at operation 704, the power management apparatus 300 pairs the selected electric device information with the smart socket ID, and stores the paired information.

In this case, displaying the message requesting that the user select the electric device interoperating with the smart socket is identical to the displaying the list of electric device names. If necessary, the power management apparatus 300 may directly receive information of the electric device name from the user.

When the electric device information is paired with the smart socket ID, the code of the power management apparatus 300 is further reflected in the paired result, such that the final paired result is stored.

The power management apparatus 300 generates the PAN ID of the paired smart socket, and transmits the generated PAN ID to the corresponding smart socket. In this case, the smart socket updates the PAN ID.

The power management apparatus 300 determines whether a registration addition signal of a new smart socket is entered at operation 705. If the new smart socket registration addition signal is entered at operation 705, operations 703 and 704 are repeated.

If the new smart socket registration addition signal is not entered, the power management apparatus 300 determines whether the smart socket registration release mode is entered by the user at operation 706.

In this case, if the user enters the smart socket registration release mode, the power management apparatus 300 displays a message requesting that the user enter an ID or code of the smart socket to be released on the display 300, and receives an ID or code of the smart socket from the user at operation 707.

The power management apparatus 300 releases the registered smart socket stored in the storage unit 340 at operation 708.

The power management apparatus determines whether the smart socket registration release addition signal of the smart socket is entered at operation 709. If the registration release addition signal of the smart socket has been entered, the operations 707 and 708 are repeated.

If the smart socket registration release addition signal is not entered, the power management apparatus 300 determines whether the change mode of the electric device interoperating with the smart socket is entered at operation 710.

In this case, if the user enters the change mode of the electric device to be interoperable with the smart socket, the power management apparatus 300 displays a message requesting that the user enter the ID or code of the smart socket on the display 330, and receives the ID or code of the smart socket from the user at operation 711.

The power management apparatus 300 displays a message inviting the user to select an electric device to interoperate with the smart socket on the display 330. If the user selects the electric device to be changed at operation 712, the selected electric device information and the smart socket ID are paired such that the paired result is stored.

In this case, the displaying the message requesting that the user select the electric device interoperating with the smart socket on the display 330 is identical to the displaying the list of names of electric devices to be interoperable with the smart socket. If necessary, the power management apparatus 300 may directly receive information of the electric device name from the user.

When the electric device information is paired with the smart socket ID, the code of the power management apparatus 300 is further reflected in the paired result, such that the final paired result is stored.

The power management apparatus 300 generates the PAN ID of the paired smart socket, and transmits the generated PAN ID to the corresponding smart socket. In this case, the smart socket updates the PAN ID.

The power management apparatus 300 determines whether the change addition signal of the electric device to interoperate with the smart socket is entered at operation 713. If the change addition signal of the electric device to interoperate with the smart socket is entered, operations 711 and 712 are repeated.

As described above, if the power management apparatus 300 is completely paired with the smart socket and the electric device, the power management apparatus 300 receives power consumption information of the paired electric device from the smart socket, and stores power consumption information of the received electric device.

The power management apparatus 300 stores power consumption information of several electric devices, schedules the driving of several electric devices on the basis of the stored power consumption information and power rate information of the power provider, and displays the scheduled information on the display 330.

The power management apparatus 300 analyzes the power consumption pattern of several electric devices, and determines whether the electric device paired with the smart socket is changed. If it is determined that the electric device paired with the smart socket has changed, the power management apparatus 300 confirms the changed electric device on the basis of the power consumption pattern of the corresponding electric device, is re-paired with the confirmed electric device, stores the paired result, and displays the stored result on the display 330.

The power management apparatus 300 confirms whether it communicates with several smart sockets in real time, such that it determines if the communication with at least one smart socket has been severed. If the communication with at least one smart socket is severed, the power management apparatus 300 searches for a PAN ID of the disconnected smart socket, and transmits a communication re-connection signal to the smart socket having the searched PAN ID, such that it attempts to communicate with the corresponding smart socket.

As described above, the smart socket can be easily registered in the power management apparatus 300, can be changed to another smart socket by the power management apparatus 300, and the registered smart socket can be released from the power management apparatus 300. When the electric device coupled to the smart socket is changed, user interaction can be minimized.

Figure 3:
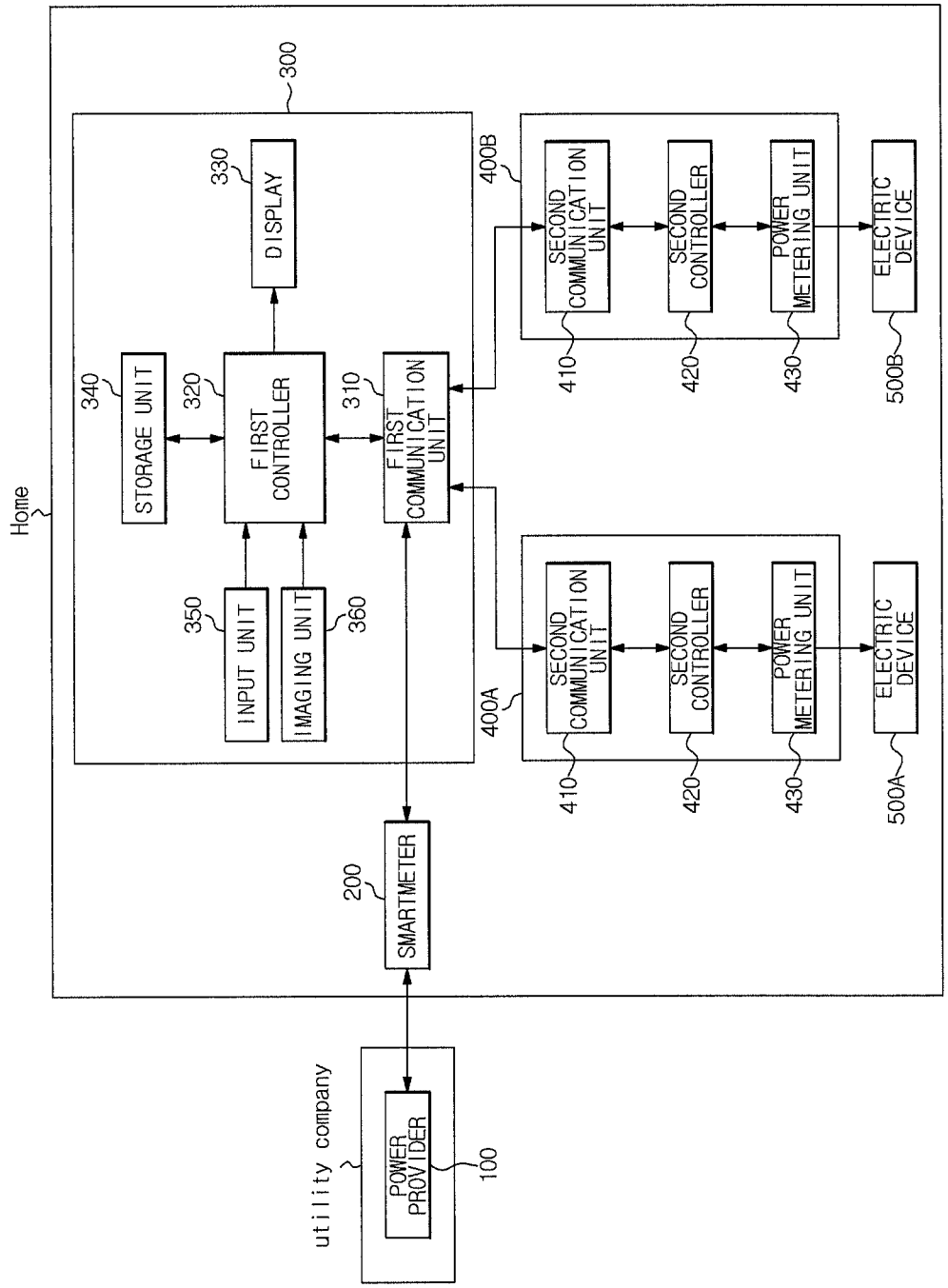
FIG. 3 is a block diagram illustrating a power management system according to another embodiment.

FIG. 3 is a block diagram illustrating a power management system according to another embodiment. The power management system shown in FIG. 3 includes the power provider 100, the smartmeter 200, the power management apparatus 300, the smart sockets 400A and 400B, and the electric devices 500A and 500B.

The power provider 100, the smartmeter 200, the smart sockets 400A and 400B, and the electric devices 500A and 500B shown in FIG. 3 are identical to the power provider 100, the smartmeter 200, the smart sockets 400A and 400B, and the electric devices 500A and 500B shown in FIG. 1, and as such a detailed description thereof will be omitted herein for convenience of description.

The power management apparatus 300 may also be referred to as a Demand Response (DR) controller. The power management apparatus 300 communicates with the smartmeter 200, and thus receives a power rate and a power rate level corresponding to the power rate from the smartmeter 200. In addition, the power management apparatus 300 communicates with the smart socket 400A or 400B to receive power consumption of the electric device 500A or 500B, schedules driving of the electric device 500A or 500B on the basis of power consumption of the electric device 500A or 500B and the price level of the power provider 100, and informs the user of the driving schedule.

The power management apparatus 300 may also establish a power rate level on the basis of power rates upon receiving only the power rates from the power provider 100.

In this way, the power management apparatus 300 collects different power consumptions of individual electric devices through the smart sockets, informs the user of the collected information, schedules an appropriate driving time point of each electric device on the basis of the collected power consumption information of the individual electric devices, and recommends the scheduling of the appropriate driving time point of each electric device and the driving time to the user.

Therefore, the power management apparatus 300 analyzes power consumption for each electric device, and distributes power consumption so as to prevent peak load. In addition, when the power rate is high, the power management apparatus 300 may inform the user of the operation stop time point of the electric device, and may invite the user to enter a low power-consumption mode, such that it can reduce the electricity bill assessed to the user.

The power management apparatus 300 includes a first communication unit 310, a first controller 320, a display 330, a storage unit 340, an input unit 350, and an imaging unit 360.

The first communication unit 310 receives power rate information from the smartmeter 200 and power rate level information corresponding to the received power rate information from the smartmeter 200 by communicating with the smartmeter 200, and transmits the received information to the first controller 320. The first communication unit 310 receives power consumption information of the electric devices 500A and 500B by communicating with the smart sockets 400A and 400B, and transmits the received power consumption information to the first controller 320.

The first communication unit 310 transmits a PAN ID to the smart socket 400A or 400б after the smart socket 400A or 400B is registered.

The first communication unit 310 automatically attempts to access the smart socket 400A or 400B having a PAN ID of the registered smart socket 400A or 400B when communication between the first communication unit 310 and the smart socket 400A or 400B registered in a PAN of the first communication unit 310 is severed, such that it can re-communicate with the smart socket 400A or 400B.

The first controller 320 executes a smart socket registration mode upon receiving a smart socket registration mode selection signal from the input unit 350, and controls the display 330 to display a procedure corresponding to the smart socket registration mode.

If the registration button is entered through the input unit 350 and the code image information of the smart socket 400A is transmitted through the imaging unit 360, the first controller 320 reads the code of the transmitted smart socket 400A, and registers the read smart socket 400A. If the electric device 500A to be coupled to the registered smart socket 400A is selected, the registered smart socket 400A is paired with the electric device 500A, and the paired result is stored in the storage unit 340.

If the smart socket is registered, the first controller 320 generates a PAN ID, controls the first communication unit 310, and transmits the generated PAN ID to the corresponding smart socket.

The smart socket registration mode may further include a change mode and a release mode.

That is, the first controller 320 executes a command corresponding to the change button signal or the release button signal generated from the input unit 350 during the smart socket registration mode.

In more detail, if the first controller receives information of the change button signal from the input unit 350, receives code image information of the smart socket from the imaging unit 360, and receives the electric device information from the input unit 350, the first controller 320 reads a code image of the smart socket, acquires a code of the smart socket, changes an electric device to be connected to the acquired smart socket, pairs the smart socket with the changed electric device, and stores the paired smart socket code and electric device information in the storage unit 340. In this case, the electric device information is a product name of the electric device.

If the first controller 320 receives a release button signal from the input unit 350, receives code image information of the smart socket from the imaging unit 360, and receives electric device information from the input unit 350, the first controller 320 reads a code image of the smart socket to acquire a code of the smart socket, releases the acquired smart socket, and deletes code information of the smart socket in the storage unit 340.

The first controller 320 configures the driving schedules of the electric devices 500A and 500B on the basis of power consumption information of the electric devices 500A and 500B received from the smart sockets 400A and 400B, and controls the display 330 to display the configured schedules.

The first controller 320 confirms a communication state with the smart sockets 400A and 400B registered in the storage unit 340 in real time. If communication with at least one smart socket from among the smart sockets 400A and 400B registered in the storage unit 340 is severed, the first controller 320 attempts to reestablish a connection with the disconnected smart socket, so that communication can again be performed with the smart socket.

The display 330 displays selection of the smart socket registration mode, and displays not only a code image capturing indication message of the smart socket corresponding to the smart socket registration mode but also an electric device selection indication message, etc.

The display 330 displays the driving schedules of the electric devices 500A and 500B in response to an indication message of the first controller 320.

The power management apparatus 300 further includes a sound unit. If the electric device paired with the smart socket is changed, the sound unit informs the user of the changed electric device. If communication between the smart socket and the power management apparatus 300 is severed, the sound unit may inform the user of the severed communication state as necessary.

The storage unit 340 stores a code of the power management apparatus 300, pairs the ID of the power management apparatus 300, the smart socket code, and the electric device information, and stores the paired result.

The storage unit 340 stores a PAN ID, an MAC address, and an IP address of the power management apparatus 300. The PAN ID and the IP address are changed according to the installation environment of the power management apparatus 300, such that they are automatically updated and stored after the power management apparatus is installed.

The input unit 350 includes a smart socket registration mode button for registering, releasing, and changing the smart socket. The input unit 350 further includes a smart socket registration button, a release button, and a change button that are activated under the smart socket registration mode. In addition, the input unit 350 further includes a character button for selecting the electric device and a character button for entering the smart socket ID. In this case, the characters may be Korean characters (Hangul), English letters, and numbers.

The input unit 350 is integrated with the display 330, thereby forming a touchscreen.

The imaging unit 360 includes an image sensor such as a Complementary Metal-Oxide Semiconductor (CMOS), a Charge Coupled Device (CCD), etc. If the code of the smart socket is located by the user, the imaging unit 360 acquires the code image of the smart socket, and transmits the acquired image to the first controller 320.

Each of the smart sockets 400A and 400B includes a terminal inserted into a commercial power-supply socket, and an insertion groove into which the plug of the electric device is inserted, and a code capable of being recognized by the imaging unit 360 of the power management apparatus 300.

In this case, the code is printed on or engraved in the smart socket 400A or 400B, and the code may be a bar code or a QR code.

Each of the smart sockets 400A and 400B includes a second communication unit 410 for communicating with the power management apparatus 300, a second controller 420 for controlling the communication of the second communication unit 410, and a power metering unit 430 for measuring power consumption of the electric device. The above-mentioned constituent elements are identical to those of the smart sockets 400A and 400B in FIG. 1, and as such a detailed description thereof will herein be omitted for convenience of description.

Figure 4:
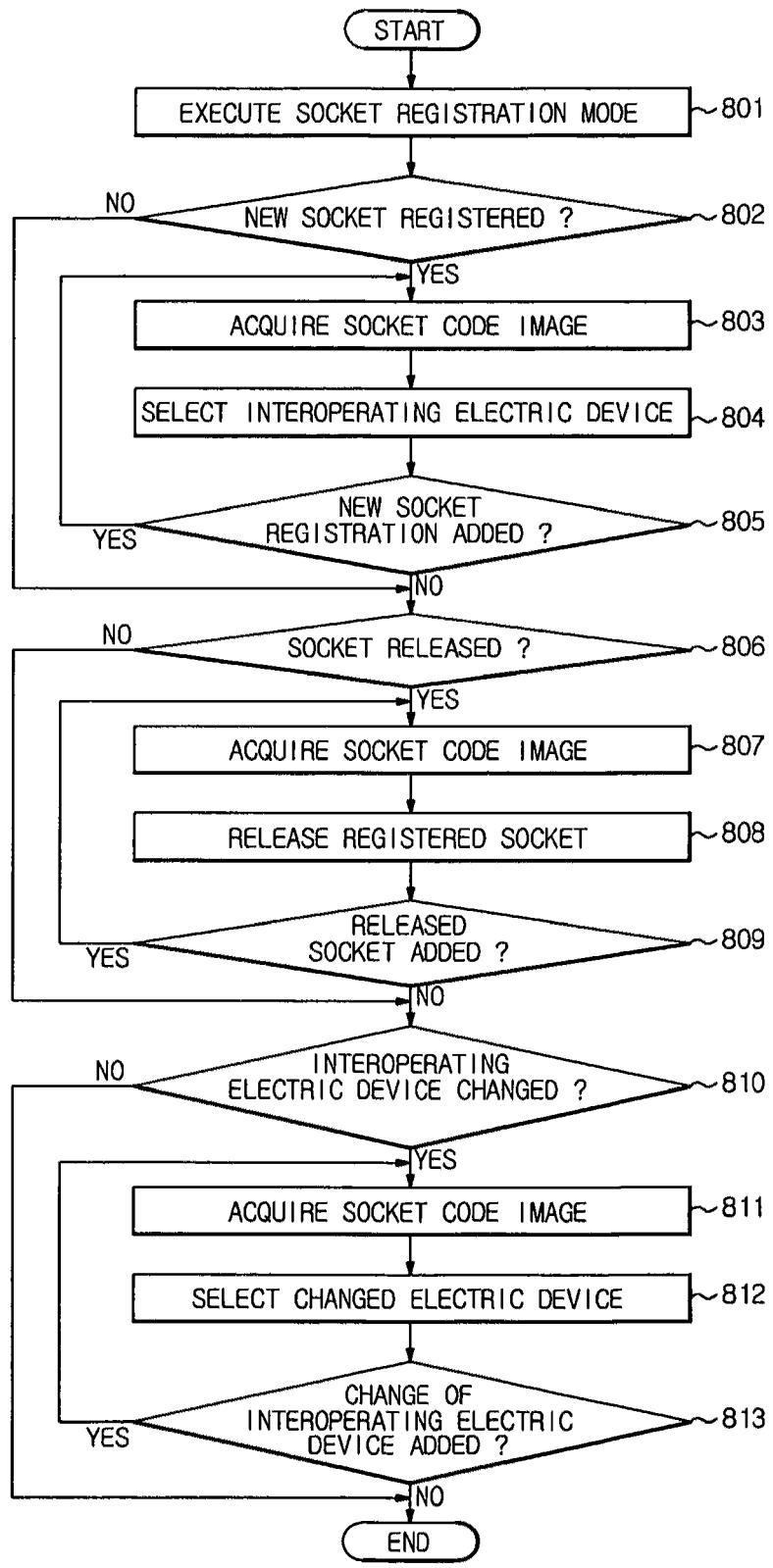
FIG. 4 is a flowchart illustrating a power management system according to another embodiment.

FIG. 4 is a flowchart illustrating a power management system according to another embodiment. A detailed description thereof will hereinafter be described with reference to FIGS. 3 and 4.

First, if the smart socket's registration mode button installed in the input unit 350 is selected by the user, the power management apparatus 300 executes the smart socket registration mode at operation 801. In this case, the power management apparatus 300 sequentially displays messages in response to the execution of the smart socket registration mode on the display 330.

In more detail, the power management apparatus 300 displays a message, that invites the user to enter any one of a new smart socket registration mode, a smart socket registration release mode, and an interoperating electric device changing mode, on the display 330.

The power management apparatus 300 receives information about any one of the new smart socket registration mode, the smart socket registration release mode, and the interoperating electric device changing mode from the user.

The power management apparatus 300 decides whether the smart socket registration mode received from the user is the new smart socket registration mode, the smart socket registration release mode, and the interoperating electric device changing mode, and performs the operation of the decided mode.

That is, if the smart socket registration mode entered by the user is the new smart socket registration mode at operation 802, the power management apparatus 300 displays a message for inviting the user to capture the code of the smart socket on the display 330, acquires the smart socket code image through the imaging unit 360 at operation 803, and receives the acquired smart socket code image.

In this case, the code of the smart socket is a bar code or a QR code, and is printed on or engraved in the smart socket. The code of the smart socket includes an IP address, a MAC address, a product name, etc. of the smart socket.

The power management apparatus 300 displays a message requesting that the user select an electric device to interwork with the smart socket on the display 330. If the user selects a desired electric device at operation 804, the power management apparatus 300 pairs the selected electric device information with the smart socket code, and stores the paired information.

In this case, displaying the message requesting that the user select the electric device interoperating with the smart socket is identical to the displaying the list of electric device names. If necessary, the power management apparatus 300 may directly receive information of the electric device name from the user.

When the electric device information is paired with the smart socket ID, the code of the power management apparatus 300 is further reflected in the paired result, such that the final paired result is stored.

In this case, the code of the power management apparatus 300 is a bar code or a QR code, and is stored in the storage unit 340. The code of the power management apparatus 300 includes a PAN ID, an IP address, a MAC address, a product name, etc.

The power management apparatus 300 generates the PAN ID of the paired smart socket, and transmits the generated PAN ID to the corresponding smart socket. In this case, the smart socket updates the PAN ID.

The power management apparatus 300 determines whether a registration addition signal of a new smart socket is entered at operation 805. If the new smart socket registration addition signal is entered at operation 805, operations 803 and 804 are repeated.

If the new smart socket registration addition signal of the power management apparatus 300 is not entered, the power management apparatus 300 determines whether the smart socket registration release mode is entered by the user at operation 806.

In this case, if the user enters the smart socket registration release mode, the power management apparatus 300 displays a message for requesting that the user enter a code of the smart socket to be released on the display 300, acquires the code image of the smart socket through the display unit 360 at operation 807, and receives the acquired smart socket code image.

The power management apparatus 300 releases the registered smart socket stored in the storage unit 340 at operation 808.

The power management apparatus determines whether the smart socket registration release addition signal of the smart socket is entered at operation 809. If the registration release addition signal of the smart socket has been entered, the operations 807 and 808 are repeated.

If the smart socket registration release addition signal is not entered, the power management apparatus 300 determines whether the change mode of the electric device interoperating with the smart socket is entered at operation 810.

In this case, if the user enters the change mode of the electric device to interoperate with the smart socket, the power management apparatus 300 displays a message for commanding the user to capture the code of the smart socket on the display 330, acquires the code image of the smart socket through the imaging unit 360 at operation 811, and reads the acquired smart socket code image.

The power management apparatus 300 displays a message inviting the user to select an electric device to interoperate with the smart socket on the display 330. If the user selects the electric device to be changed at operation 812, the selected electric device information and the smart socket ID are paired such that the paired result is stored.

In this case, the displaying the message requesting that the user select the electric device interoperating with the smart socket on the display 330 is identical to the displaying the list of product names of electric devices to interoperate with the smart socket. If necessary, the power management apparatus 300 may directly receive information of the electric device name from the user.

When the electric device information is paired with the smart socket ID, the code of the power management apparatus 300 is further reflected in the paired result, such that the final paired result is stored.

The power management apparatus 300 generates the PAN ID of the paired smart socket, and transmits the generated PAN ID to the corresponding smart socket. In this case, the smart socket updates the PAN ID.

The power management apparatus 300 determines whether the change addition signal of the electric device to interoperate with the smart socket is entered at operation 813. If the change addition signal of the electric device to interoperate with the smart socket is entered, operations 811 and 812 are repeated.

As described above, if the power management apparatus 300 is completely paired with the smart socket and the electric device, the power management apparatus 300 receives power consumption information of the paired electric device from the smart socket, and stores power consumption information of the received electric device.

The power management apparatus 300 stores power consumption information of several electric devices, schedules the driving of several electric devices on the basis of the stored power consumption information and power rate information of the power provider, and displays the scheduled information on the display 330.

The power management apparatus 300 analyzes the power consumption pattern of several electric devices, and determines whether the electric device paired with the smart socket is changed. If it is determined that the electric device paired with the smart socket has been changed, the power management apparatus 300 confirms the changed electric device on the basis of the power consumption pattern of the corresponding electric device, is again paired with the confirmed electric device, stores the paired result, and displays the stored result on the display 330.

The power management apparatus 300 confirms whether it communicates with several smart sockets in real time, such that it determines whether communication with at least one smart socket is severed. If communication with at least one smart socket is severed, the power management apparatus 300 searches for a PAN ID of the disconnected smart socket, and transmits a communication re-connection signal to the smart socket having the PAN ID, such that it attempts to communicate with the corresponding smart socket.

Figure 5:
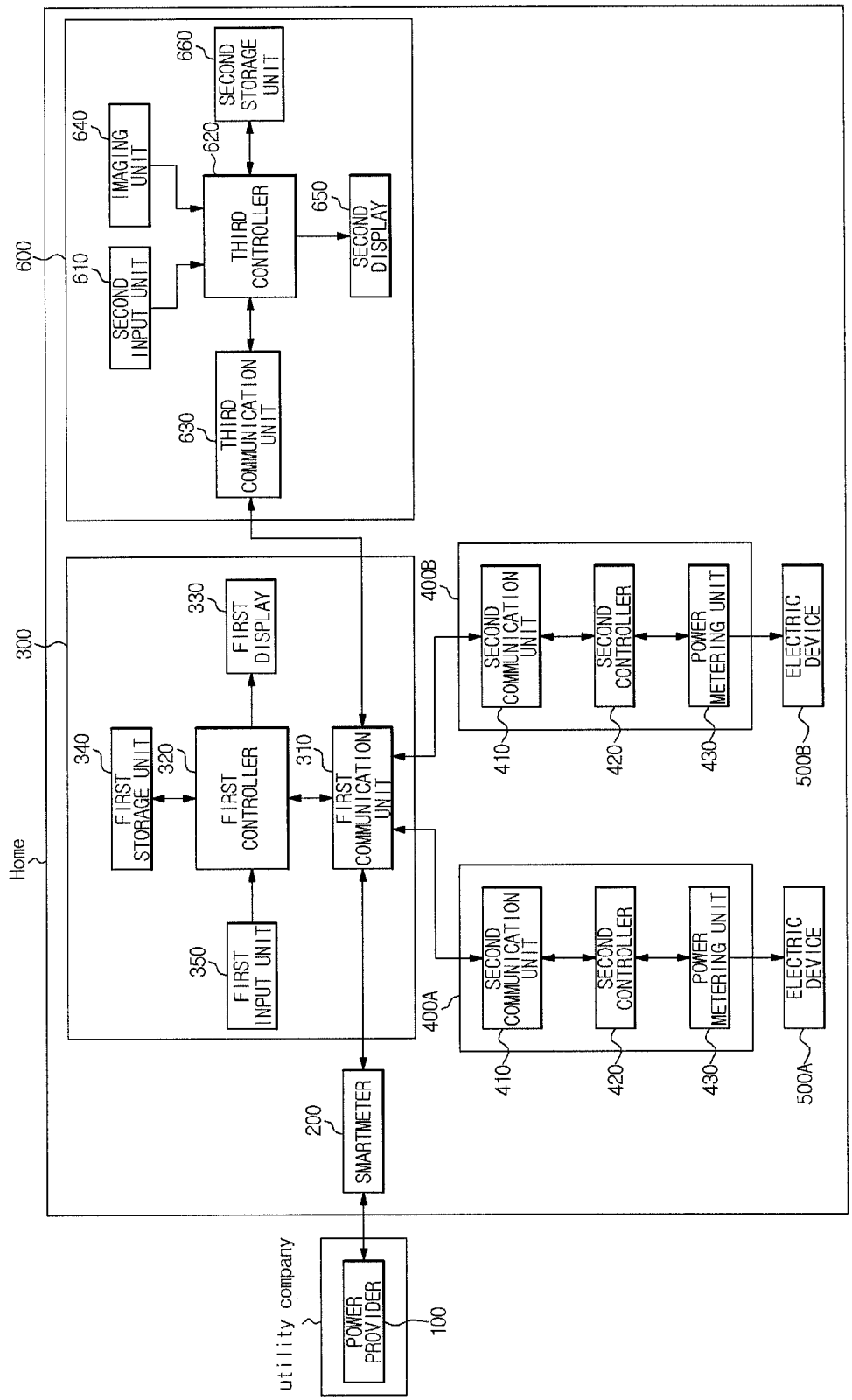
FIG. 5 is a block diagram illustrating a power management system according to another embodiment.

FIG. 5 is a block diagram illustrating a power management system according to another embodiment. The power management system shown in FIG. 5 includes the power provider 100, the smartmeter 200, the power management apparatus 300, the smart sockets 400A and 400B, the electric devices 500A and 500B, and the terminal 600.

The power provider 100, the smartmeter 200, the smart sockets 400A and 400B, and the electric devices 500A and 500B shown in FIG. 5 are identical to the power provider 100, the smartmeter 200, the smart sockets 400A and 400B, and the electric devices 500A and 500B shown in FIG. 1, and as such a detailed description thereof will herein be omitted for convenience of description.

The power management apparatus 300 may also be referred to a Demand Response (DR) controller. The power management apparatus 300 communicates with the smartmeter 200, and thus receives a power rate and a power rate level corresponding to the power rate from the smartmeter 200. In addition, the power management apparatus 300 communicates with the smart socket 400A or 400B to receive power consumption of the electric device 500A or 500B, schedules driving of the electric device 500A or 500B on the basis of power consumption of the electric device 500A or 500B and the price level of the power provider 100, and informs the user of the driving schedule.

The power management apparatus 300 may also establish a power rate level on the basis of power rates upon receiving only the power rates from the power provider 100.

If the number of the terminal 600 is entered, the power management apparatus 300 transmits an authentication number to the entered number. If authentication in relation to the terminal 600 is normally completed, the power management apparatus 300 transmits an application to the terminal 600.

Through the above-mentioned procedure, the power management apparatus 300 communicates with the terminal 600, receives pairing information from the terminal 600, communicates with the smart sockets 400A and 400B on the basis of the transmitted pairing information, and receives power consumption information of the electric devices 500A and 500B.

In this way, the power management apparatus 300 collects different power consumptions of individual electric devices through the smart sockets, informs the user of the collected information, schedules an appropriate driving time of each electric device on the basis of the collected power consumption information of the individual electric devices, and recommends the scheduling of the appropriate driving time point of each electric device and the driving time to the user.

Therefore, the power management apparatus 300 analyzes power consumption for each electric device, and balances power consumption so as to prevent peak load. In addition, when the power rate is high, the power management apparatus 300 may inform the user of the operation stop time point of the electric device, and may invite the user to enter a low power-consumption mode, such that it can reduce the electricity bill to be assessed to the user.

The power management apparatus 300 includes a first communication unit 310, a first controller 320, a first display 330, a first storage unit 340, and a first input unit 350.

The first communication unit 310 receives power rate information from the smartmeter 200 and power rate level information corresponding to the received power rate information from the smartmeter 200 by communicating with the smartmeter 200, and transmits the received information to the first controller 320. The first communication unit 310 receives power consumption information of the electric devices 500A and 500B by communicating with the smart sockets 400A and 400B, and transmits the received power consumption information to the first controller 320.

The first communication unit 310 receives a pairing signal from the terminal 600 by communicating with the terminal 600, transmits the pairing signal to the first controller 320, and transmits a PAN ID to the paired smart sockets 400A and 400B.

The first communication unit 310 automatically attempts to access the smart socket 400A or 400B having a PAN ID of the registered smart socket 400A or 400B when communication between the first communication unit 310 and the smart socket 400A or 400B registered in a PAN of the first communication unit 310 is severed, such that it can re-communicate with the smart socket 400A or 400B.

The first controller 320 executes a smart socket registration mode upon receiving a smart socket registration mode selection signal from the input unit 350, and displays a code of the power management apparatus 300 by controlling driving of the display 330.

Upon receiving the pairing signal from the terminal 600, the first controller 320 stores the pairing information between the smart socket and the electric device in the first storage unit 340, generates a PAN ID, and transmits the generated PAN ID to the smart socket by controlling the first communication unit 310.

The first controller 320 configures the driving schedules of the electric devices 500A and 500B on the basis of power consumption information of the electric devices 500A and 500B received from the smart sockets 400A and 400B, and controls the display 330 to display the configured schedules.

The first controller 320 confirms a communication state with the smart sockets 400A and 400B registered in the storage unit 340 in real time. If communication with at least one smart socket from among the smart sockets 400A and 400B registered in the storage unit 340 is severed, the first controller 320 attempts to reestablish a connection with the disconnected smart socket, so that it can communicate with the disconnected smart socket.

The first controller 320 analyzes a power consumption pattern or a power factor of each electric device 500A or 500B, and determines whether the electric device coupled to the smart socket is changed.

When the registration modes of the smart sockets 400A and 400B are executed upon receiving an indication message from the first controller 320, the first display 330 displays a code for allowing the imaging unit 640 of the terminal 600 to recognize the registration mode execution. This code includes a PAN ID, a MAC address, and IP address information of the power management apparatus 300.

The display 330 displays the driving schedules of the electric devices 500A and 500B in response to an indication message of the first controller 320.

The power management apparatus 300 further includes a sound unit. If the electric device paired with the smart socket is changed, the sound unit informs the user of the changed electric device. If communication between the smart socket and the power management apparatus 300 is severed, the sound unit may inform the user of the severed communication state as necessary.

The first storage unit 340 stores a code assigned to the power management apparatus 300, pairs the code of the power management apparatus 300, the smart socket code, and the electric device information, stores the paired result, and also stores the PAN ID of the smart socket.

The storage unit 340 stores a PAN ID, an MAC address, and an IP address of the power management apparatus 300. The PAN ID and the IP address are changed according to the installation environment of the power management apparatus 300, such that they are automatically updated and stored after the power management apparatus 300 is installed.

The input unit 350 includes a smart socket registration mode button for registering, releasing, and changing the smart socket. If the smart socket registration mode button is entered, the entered smart socket registration mode button signal is transmitted to the first controller 320.

The first input unit 350 is integrated with the first display 330, thereby forming a touchscreen.

Each of the smart sockets 400A and 400B includes a terminal inserted into a commercial power-supply socket, an insertion groove into which the plug of the electric device is inserted, and a code capable of being recognized by the imaging unit 360 of the power management apparatus 300.

In this case, the code is printed on or engraved in the smart socket 400A or 400B, and the code may be a bar code or a QR code.

Each of the smart sockets 400A and 400B includes a second communication unit 410 for communicating with the power management apparatus 300, a second controller 420 for controlling the communication of the second communication unit 410, and a power metering unit 430 for measuring power consumption of the electric device. The above-mentioned constituent elements are identical to those of the smart sockets 400A and 400B shown in FIG. 1, and as such a detailed description thereof will herein be omitted for convenience of description.

The terminal 600 can capture an image and communicate with other components. For example, the terminal 600 may be any of a mobile phone, a PC, a smart phone, etc.

The terminal 600 includes an application for pairing the power management apparatus 300, the smart sockets 400A and 400B, the electric devices 500A and 500B. After execution of the application, the terminal 600 obtains a code image of the power management apparatus 300 and a code image of the smart socket 400A, reads the individual code images, receives information of the electric device 500A to be coupled to the smart socket, pairs the received information with the power management apparatus 300, the smart socket 400A, and the electric device 500A, and transmits the paired information to the power management apparatus 300.

If the application is not installed in the terminal 600, the terminal 600 receives an authentication number from the power management apparatus 300, performs authentication, and downloads the application.

The terminal 600 includes a second input unit 610, a third controller 620, a third communication unit 630, an imaging unit 640, a second display 650, and a second storage unit 660.

The second input unit 610 includes an application button for executing the smart socket registration mode, and further includes a smart socket registration button, a release button, and a change button that are activated under the smart socket registration mode. In addition, the input unit 350 further includes a character button for selecting the electric device. In this case, the characters may include Korean characters (Hangul), English letters, and numbers.

If the third controller 620 receives the application button selection signal through the second input unit 610, it executes the smart socket registration mode, and displays a procedure corresponding to the smart socket registration mode by controlling the driving of the second display 650.

If the registration button is entered through the second input unit 610 and the code image information of the smart socket 400A and the power management apparatus 300 is transmitted through the imaging unit 640, the third controller 620 reads the codes of the power management apparatus 300 and the smart socket 400A, and registers the power management apparatus 300 and the smart socket 400A. If the electric device 500A to be coupled to the registered smart socket 400A is selected through the second input unit 610, the smart socket 400A is paired with the electric device 500A, and the paired result is stored in the second storage unit 660.

The smart socket registration mode may further include a change mode and a release mode.

That is, the third controller 620 performs a command corresponding to the change button signal or the release button signal generated from the second input unit 610 during application execution.

In more detail, if the third controller 620 receives information of the change button signal from the second input unit 610, receives code image information of the power management apparatus 300 and the smart socket 400A from the imaging unit 640, and receives information of the electric device 500A from the second input unit 610, the third controller 620 reads code images of the power management apparatus 300 and the smart socket 400A, acquires codes of the power management apparatus 300 and the smart socket 400A, changes the electric device 500B to be connected to the smart socket 400A, pairs the smart socket with the changed electric device, and stores the codes of the paired power management apparatus 300 and the smart socket 400A and information of the electric device 500B in the second storage unit 660. In this case, the electric device information is a product name of the electric device.

The third controller 620 receives a release button signal from the second input unit 610, receives code image information of the smart socket 400A and the power management apparatus 300 from the imaging unit 640, and reads code images of the smart socket 400A and the power management 300 to acquire the codes of the smart socket 400A and the power management apparatus 300, such that the power management apparatus 300 controls the smart socket 400A information to release the registered smart socket 400A to be stored in the second storage unit 660.

The third controller 620 extracts information stored in the second storage unit 660, and transmits the extracted information to the power management apparatus 300 through the third communication unit 630.

In response to the indication message of the third controller 620, the third communication unit 630 transmits registration, change, and release information of the smart socket 400A to the power management apparatus 300.

The imaging unit 640 includes an image sensor such as a Complementary Metal-Oxide Semiconductor (CMOS), a Charge Coupled Device (CCD), etc. If the codes of the smart sockets 400A and 400B and the first display 330 of the power management apparatus 300 are located by the user, the imaging unit 640 acquires the code images of the smart sockets 400A and 400B and the power management apparatus 300, and transmits the acquired images to the third controller 620.

The second display 650 displays selection of an application for executing the smart socket registration mode, and displays a code image capturing indication message and an electric device selection indication message for the power management apparatus 300 and the smart socket 400A or 400B that correspond to the smart socket registration mode.

In response to the smart socket registration mode execution, the second storage unit 660 stores not only the pairing information of the power management apparatus 300, the smart socket 400A, and the electric device 500A but also the pairing information of the power management apparatus 300, the smart socket 400A, and the electric device 500A.

If the electric device to be coupled to the smart socket is changed, the second storage unit 660 stores the changed information. If any one of the smart sockets is released, the second storage unit 660 stores the released smart socket information.

Figure 6:
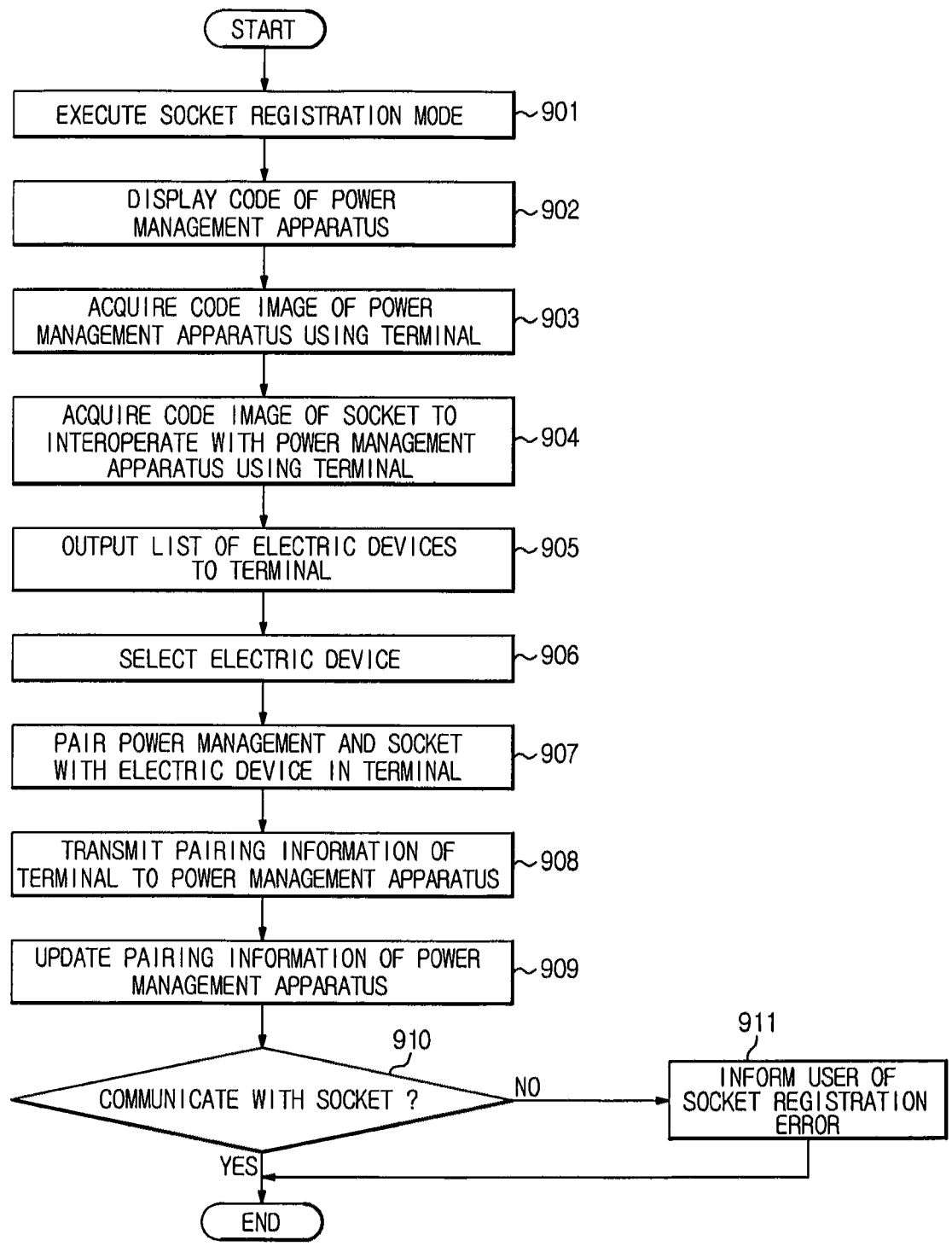
FIG. 6 is a flowchart illustrating a method for controlling a power management system according to another embodiment.

FIG. 6 is a flowchart illustrating a method for controlling a power management system according to another embodiment. A detailed description thereof will hereinafter be given with reference to FIGS. 5 and 6.

First, the application for registering, releasing, and changing the smart socket is downloaded to the terminal.

If the application for registering, releasing, and changing the smart socket is executed, the power management apparatus 300 determines whether the terminal from which the application is to be transmitted is registered. If the terminal is not registered, the power management system asks the user to enter a number of the terminal to be registered.

If the terminal number is entered, the power management apparatus 300 transmits an authentication number to the corresponding terminal. Upon receiving the authentication number, the power management apparatus 300 determines whether the received authentication number is identical to the transmitted authentication number. If the input authentication number is identical to the transmitted authentication number, authentication with the terminal is completed, and the application is transmitted to the terminal.

In this case, the terminal receives the application from the power management apparatus 300.

Otherwise, the terminal acquires the code image of the power management apparatus 300, reads the acquired code image, and communicates with the power management apparatus 300 on the basis of the read code information. In this case, the terminal may also receive the application from the power management apparatus 300.

In this case, the code of the power management apparatus 300 includes an IP address, a MAC address, and PAN ID information. The terminal obtains code information of the power management apparatus 300, such that it can communicate with the power management apparatus.

If the smart socket registration mode button of the input unit 350 is selected by the user, the power management apparatus 300 executes the smart socket registration mode at operation 901. In this case, the power management apparatus 300 displays the code through the first display 330 at operation 902.

In this case, the code of the power management apparatus 300 is a bar code or a QR code, and is stored in the first storage unit 340. In addition, the code of the power management apparatus 300 may also be printed or engraved as necessary.

The code of the power management apparatus 300 includes a PAN ID, an IP address, a MAC address, a product name, etc. The PAN ID and the IP address may be changed according to the installation environment of the power management apparatus 300, such that they are automatically updated and stored.

The application of the terminal 600 is executed by the user. In this case, the terminal 600 displays a message inviting the user to enter any one of a new smart socket registration mode, a smart socket registration release mode, and an interoperating electric device changing mode, on the second display 650.

Subsequently, the terminal 600 receives information about any one of the new smart socket registration mode, the smart socket registration release mode, and the interoperating electric device changing mode from the user.

The power management apparatus 300 decides whether the smart socket registration mode received from the user is the new smart socket registration mode, the smart socket registration release mode, and the interoperating electric device changing mode, and performs the operation of the decided mode.

That is, if the smart socket registration mode entered by the user is the new smart socket registration mode, the power management apparatus 300 displays a message for commanding the second display 650 to capture the code of the power management apparatus 300, acquires the code image of the power management apparatus 300 through the imaging unit 640 at operation 903, and reads the acquired smart socket code image.

In this case, if the code image of the power management apparatus is not read, a request to recapture the code image of the power management apparatus 300 is generated. If the code of the pre-registered power management apparatus 300 is decided, a message requesting that the user confirm the code is generated.

The terminal 600 displays a message for capturing the code of the smart socket through the second display 650, acquires the code image of the smart socket through the imaging unit 640 at operation 904, and reads the acquired smart socket code image.

In this case, if the code image of the smart socket is not read, a request message for re-capturing the code image of the smart socket is generated. If the code of the pre-registered smart socket is decided, a message requesting that the user confirm this code is generated.

In this case, the smart socket code is a bar code or a QR code, and is printed on or engraved in the smart socket. The smart socket code includes an IP address, a MAC address, and product name information of the smart socket. In this case, the MAC address information corresponding to the physical address must be contained in the smart socket code. If necessary, the smart socket code need not include specific information (e.g., IP address or PAN ID) that is capable of being changed according to circumstance.

In this case, the terminal 600 may display a message that invites the user to enter an electric device to interoperate with the smart socket, and the list of electric devices on the second display 650 at operation 905. If the electric device is selected by the user at operation 906, information of the selected electric device is paired with the code of the power management apparatus 300 at operation 907, and the paired information is stored.

In this case, the user may directly enter the product name of the electric device to interoperate with the smart socket through the display 330, and an image of the electric device may be displayed as a popup as necessary.

If the pre-selected electric device is decided, a confirmation message is transmitted to the user.

The terminal 600 transmits the paired information to the power management apparatus 300 at operation 908. In this case, the power management apparatus 300 updates the paired information at operation 909 and stores the updated information.

The power management apparatus 300 generates a PAN ID of the paired smart socket, and transmits the generated PAN ID to the corresponding smart socket, such that it communicates with the smart socket at operation 910.

In this case, if communication between the power management apparatus 300 and the smart socket is severed, the power management apparatus 300 informs the user of the smart socket registration error at operation 911. While the power management apparatus 300 communicates with the smart socket, the smart socket updates the PAN ID. In this case, the power management apparatus 300 may also transmit the IP address to the smart socket. The smart socket also updates the IP address.

The smart socket registration release mode will hereinafter be described in detail.

If the smart socket registration release mode is input to the terminal 600, the terminal 600 displays a message for capturing the code of the power management apparatus 600 through the second display 650, acquires the code image of the power management apparatus 600 through the imaging unit 640, and reads the acquired code image of the power management apparatus 600.

The terminal 600 displays a message for capturing the code of the smart socket to be released through the second display 650, acquires the code image of the smart socket through the imaging unit 640, and reads the acquired smart socket code image.

The terminal 600 transmits code information of the smart socket to the power management apparatus 600. In this case, the power management apparatus 300 deletes and releases the smart socket stored in the first storage unit 340.

The smart socket registration release mode will hereinafter be described in detail.

If the change mode of the electric device to interoperate with the smart socket is input to the terminal 600, the terminal 600 displays a message for capturing the code of the power management apparatus 600 through the second display 650, acquires the code image of the power management apparatus 600 through the imaging unit 640, and reads the acquired code image of the power management apparatus 600.

The terminal 600 displays a message for capturing the code of the registered smart socket through the second display 650, acquires the code image of the smart socket through the imaging unit 640, and reads the acquired smart socket code image.

The terminal 600 displays a message requesting that the user select an electric device to interoperate with the smart socket through the second display 650. If the user selects the electric device to interoperate with the smart socket through the second display 650, the selected electric device information, the smart socket code, and the code of the power management apparatus 300 are paired with one another, such that the paired information is stored.

The terminal 600 transmits the stored pairing information to the power management apparatus 300. In this case, the power management apparatus 300 updates the pairing information and stores the updated pairing information.

In this case, the displaying the message requesting that the user select the electric device interoperating with the smart socket on the display 330 is identical to the displaying the list of electric device names. If necessary, the power management apparatus 300 may directly receive the electric device name from the user.

The power management apparatus 300 generates the PAN ID of the paired smart socket, and transmits the generated PAN ID to the corresponding smart socket. In this case, the smart socket updates the PAN ID.

As described above, if the power management apparatus 300 is paired with the smart socket and the electric device, the power management apparatus 300 receives power consumption information of the paired electric device from the smart socket, and stores power consumption information of the received electric device.

The power management apparatus 300 confirms whether it communicates with several smart sockets in real time, such that it determines that communication with at least one smart socket is severed. If communication with at least one smart socket is severed, the power management apparatus 300 searches for a PAN ID of the disconnected smart socket, and transmits a communication re-connection signal to the smart socket having the searched PAN ID, such that it attempts to communicate with the corresponding smart socket.

The power management apparatus 300 stores power consumption information of several electric devices, schedules driving of several electric devices on the basis of the stored power consumption information and power rate information of the power provider, and displays the scheduled information on the display 330.

The power management apparatus 300 analyzes the power consumption pattern of several electric devices, and determines whether the electric device paired with the smart socket has changed. If it is determined that the electric device paired with the smart socket was changed, the power management apparatus 300 confirms the changed electric device on the basis of the power consumption pattern of the corresponding electric device, is re-paired with the confirmed electric device, stores the paired result, and displays the stored result on the display 330. A detailed description thereof will hereinafter be described with reference to FIGS. 7A and 7B.

Figure 7A:
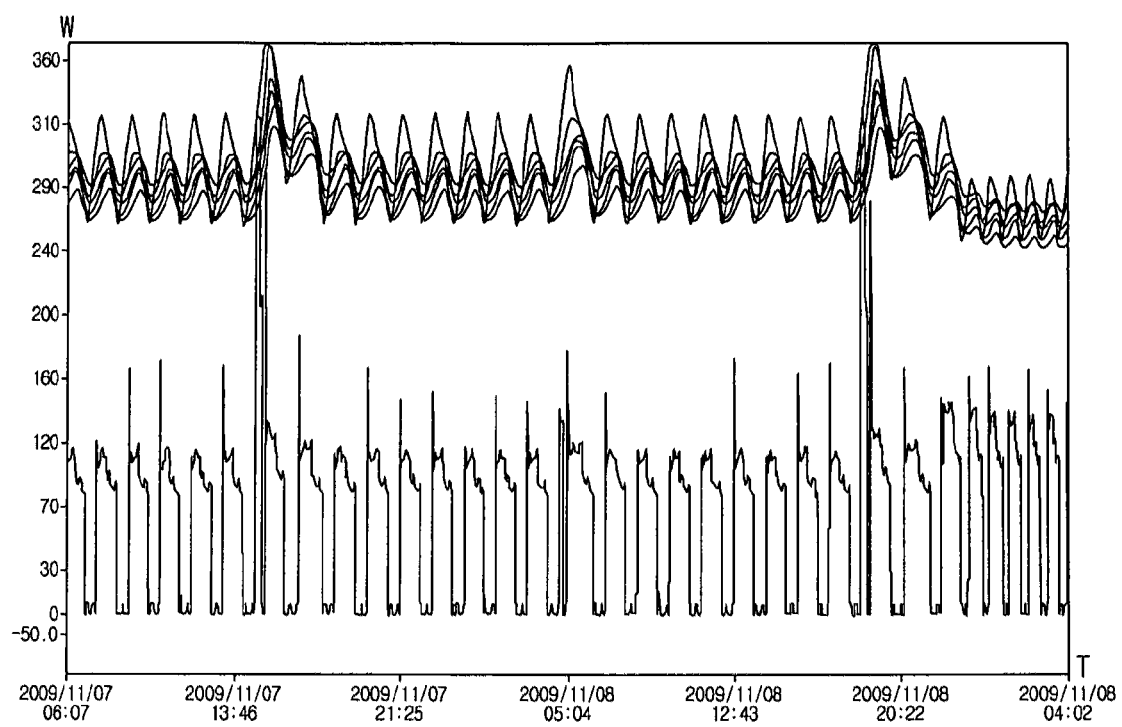
FIGS. 7A and 7B exemplarily show an electric device installed in the power management system according to still another embodiment.
Figure 7B:
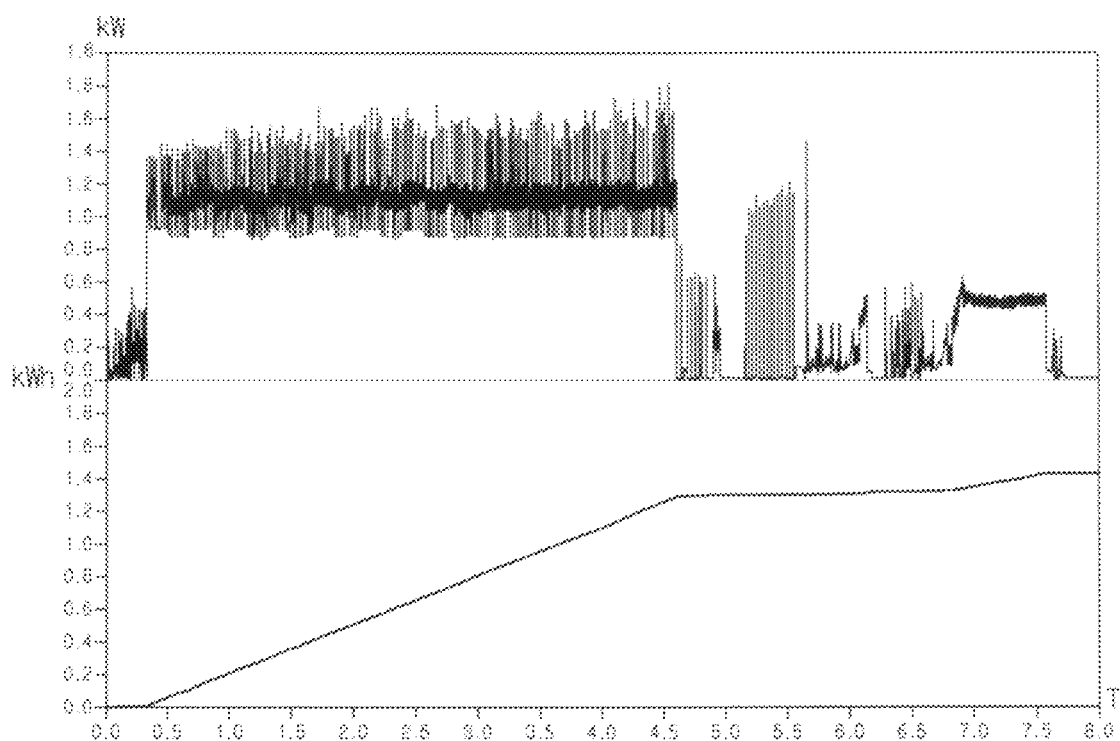

FIG. 7A exemplarily shows the power consumption pattern of a refrigerator, and FIG. 7B exemplarily shows the power consumption pattern of a washing machine.

In the case where the power management apparatus 300 and the smart socket 400A are paired with the electric device 500A, and the power management apparatus 300 and the smart socket 400B are paired with the electric device 500B, a refrigerator serving as the electric device 500A is interoperable with the smart socket 400A and a washing machine serving as the electric device 500B is interoperable with the smart socket 400B, such that the power consumption pattern of the refrigerator corresponding to the electric device 500A is stored in FIG. 7A and the power consumption pattern of the washing machine corresponding to the electric device 500B is stored in FIG. 7B.

However, if the interoperating relationship is changed due to the user's moving to a new house, such that the electric device 500B is interoperable with the smart socket 400A and the electric device 500A is interoperable with the smart socket 400B, the electric device power consumption pattern transmitted from the smart socket 400A is output as a power consumption pattern of the washing machine, and the electric device power consumption pattern transmitted from the smart socket 400B is output as a power consumption pattern of the refrigerator.

That is, since the power consumption patterns of the washing machine and the refrigerator are different from FIGS. 7A and 7B, the power management apparatus 300 detects a different power consumption pattern of the electric device interoperating with the smart socket, and displays the detected power consumption pattern on the first display 330. The power management apparatus 300 analyzes the power consumption pattern detected through the smart socket, searches for a power consumption pattern of the electric device corresponding to the analyzed result, and re-connects the smart socket to the electric device.

In addition, the power management apparatus 300 analyzes a power factor of the electric device on the basis of the electric device power consumption transmitted from the smart socket, and decides whether the electric device is changed on the basis of the power factor.

As is apparent from the above description, according to the power management apparatus, users of all ages and even a user who has poor dexterity can easily register, change, and release the smart socket and the electric device, such that user efficiency is increased and the user accessibility is maximized.

In addition, the power management apparatus analyzes the power factor and the power consumption pattern of each electric device. If the electric device coupled to the smart socket is changed, the power management apparatus 300 informs the user of the changed electric device, automatically searches for an electric device connected to the smart socket, and again pairs the searched electric device with the smart socket, such that the pairing information between the smart socket registered in the power management apparatus can be maintained.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A power management apparatus comprising:
  a display to display a message that invites the user to input an identification (ID) number of a smart socket and information of an electric device to be coupled to the smart socket in a registration mode of the smart socket;
  an input unit to receive the ID number of the smart socket and the information of the electric device to be coupled to the smart socket from the user; and
  a controller to pair the ID number of the smart socket with the electric device information,
  wherein the controller, if the ID number of the smart socket is paired with the electric device information, generates a Personal Area Network identification number (PAN ID) of the smart socket representing the pairing of the smart socket with the electric device, and further includes a communication unit to transmit the generated PAN ID to the smart socket, and
  the controller confirms a communication state with the smart socket, and if communication with the smart socket is severed, the controller searches for a PAN ID corresponding to the disconnected smart socket, and re-communicates with the smart socket having the searched PAN ID.

2. The apparatus according to claim 1, further comprising:
  a storage unit to store the PAN ID, an Internet Protocol (IP) address, and an MAC address, and store the ID number of the paired smart socket with the electric device information.

3. The apparatus according to claim 1, wherein the controller further includes a change mode to change information of the electric device to be coupled to the smart socket, and a release mode to release the registered smart socket.

4. The apparatus according to claim 1, wherein the controller receives power rate information from a power provider, receives power consumption information of the electric device from the smart socket, and configures a driving schedule of the electric device on the basis of power consumption information of the power rate information and the power consumption information of the electric device.

5. The apparatus according to claim 1, wherein the controller receives power consumption information of the electric device from the smart socket, and determines whether the electric device coupled to the smart socket is changed on the basis of power consumption information of the electric device.

6. The apparatus according to claim 1, wherein the controller receives power consumption information of the electric device from the smart socket, collects power factor information of the electric device by analyzing the power consumption information of the electric device, and determines whether the electric device coupled to the smart socket is changed on the basis of the collected power factor information.

7. A power management apparatus comprising:
a display to display a message that invites the user to input a code image of a smart socket and information of an electric device to be coupled to the smart socket in a registration mode of the smart socket;
an imaging unit to acquire a code image from a code assigned to the smart socket;
an input unit to receive information of the electric device to be coupled to the smart socket; and
a controller to acquire the code by reading the code image, recognize the smart socket using the code, and pair the recognized smart socket with the electric device information,
wherein the code is one selected from the group consisting of a bar code and a QR code, and
wherein the controller, if the code image of the smart socket is paired with the electric device information, generates a Personal Area Network identification number (PAN ID) of the smart socket representing the pairing of the smart socket with the electric device, and further includes a communication unit to transmit the generated PAN ID to the smart socket.

8. The apparatus according to claim 7, wherein the controller confirms a communication state with the smart socket,
if communication with the smart socket is severed, the controller searches for a PAN ID corresponding to the disconnected smart socket, and re-communicates with the smart socket having the searched PAN ID.

9. The apparatus according to claim 7, wherein the controller receives power rate information from a power provider, receives power consumption information of the electric device from the smart socket, and configures a driving schedule of the electric device on the basis of power consumption information of the power rate information and the power consumption information of the electric device.

10. The apparatus according to claim 7, wherein the controller receives power consumption information of the electric device from the smart socket, and determines whether the electric device coupled to the smart socket is changed on the basis of power consumption information of the electric device.

11. The apparatus according to claim 7, wherein the controller receives power consumption information of the electric device from the smart socket, collects power factor information of the electric device by analyzing the power consumption information of the electric device, and determines whether the electric device coupled to the smart socket is changed on the basis of the collected power factor information.

12. A method for controlling a power management apparatus comprising:
if a registration mode of a smart socket is carried out by a user, receiving an identification (ID) number of the smart socket;
receiving information of an electric device to be coupled to the smart socket;

pairing the received electric device information with the ID number of the smart socket;
receiving power rate information from a power provider;
receiving power consumption information of the electric device from the smart socket;
configuring a driving schedule of the electric device on the basis of the power rate information and the power consumption information of the electric device, and displaying the configured driving schedule;
if the ID number of the smart socket is paired with the electric device information, generating a Personal Area Network identification number (PAN ID) of the smart socket, the PAN ID representing the pairing of the smart socket with the electric device;
transmitting the generated PAN ID to the smart socket;
receiving power rate information from a power provider;
receiving power consumption information of the electric device from the smart socket connected by the PAN ID; and
configuring a driving schedule of the electric device on the basis of the power rate information and the power consumption information of the electric device, and displaying the configured driving schedule.

13. The method according to claim 12, further comprising:
confirming a communication state with the smart socket;
if the disconnected smart socket is confirmed, searching for a PAN ID corresponding to the disconnected smart socket; and
re-communicating with the smart socket having the searched PAN ID.

14. The method according to claim 12, wherein the pairing of the smart socket ID number and the electric device information further includes:
pairing a PAN ID of the smart socket and an IP address with MAC address information.

15. The method according to claim 12, further comprising:
if an information change mode of the electric device to be coupled to the smart socket is performed, receiving an identification (ID) number of the smart socket;
receiving information of the electric device to be changed; and
pairing the ID number of the smart socket with the information of the electric device to be changed, and storing the paired result.

16. The method according to claim 12, further comprising:
if a registration release mode of the smart socket is performed, receiving an identification (ID) number of the smart socket; and
deleting the ID number of the smart socket, and releasing the registered smart socket.

17. The method according to claim 12, further comprising:
determining whether the electric device coupled to the smart socket is changed on the basis of power consumption information of the electric device.

18. The method according to claim 12, further comprising:
collecting power factor information of the electric device by analyzing the power consumption information of the electric device; and
determining whether the electric device coupled to the smart socket is changed on the basis of the collected power factor information.

* * * * *

UNITED STATES PATENT AND TRADEMARK OFFICE
CERTIFICATE OF CORRECTION

PATENT NO. : 9,118,218 B2
APPLICATION NO. : 13/137151
DATED : August 25, 2015
INVENTOR(S) : Young Jin Park et al.

Page 1 of 1

It is certified that error appears in the above-identified patent and that said Letters Patent is hereby corrected as shown below:

On the title page after item "(65)     Prior Publication Data

US 2012/0089263 A1     Apr. 12, 2012"

insert --(30)     Foreign Application Priority Data

Oct. 12, 2010 (KR).......................10-2010-0099070--

Signed and Sealed this
Twenty-fourth Day of November, 2015

Michelle K. Lee
*Director of the United States Patent and Trademark Office*